US008507024B2

(12) United States Patent
Itoh

(10) Patent No.: US 8,507,024 B2
(45) Date of Patent: Aug. 13, 2013

(54) METHOD OF TREATING FOOD AND FOOD OBTAINED BY THIS METHOD

(75) Inventor: Shigeru Itoh, Kumamoto (JP)

(73) Assignee: National University Corporation Kumamoto University, Kumamoto (JP)

( * ) Notice: Subject to any disclaimer, the term of this patent is extended or adjusted under 35 U.S.C. 154(b) by 0 days.

(21) Appl. No.: 13/114,892

(22) Filed: May 24, 2011

(65) Prior Publication Data

US 2011/0223294 A1   Sep. 15, 2011

Related U.S. Application Data

(62) Division of application No. 11/886,061, filed as application No. PCT/JP2006/305460 on Mar. 17, 2006.

(30) Foreign Application Priority Data

Mar. 17, 2005 (JP) ................................ 2005-077735

(51) Int. Cl.
*A23L 1/212* (2006.01)

(52) U.S. Cl.
USPC .......................................... 426/615; 426/238

(58) Field of Classification Search
USPC ................. 426/615–640, 643, 425–437, 238; 422/20, 39, 127
See application file for complete search history.

(56) References Cited

U.S. PATENT DOCUMENTS

| | | | |
|---|---|---|---|
| 2,929,098 A | 3/1960 | Simjian | |
| 3,218,188 A | 11/1965 | Friedrich et al. | |
| 3,320,992 A | 5/1967 | Bodine | |
| 3,389,997 A | 6/1968 | Merton | |
| 3,492,688 A | 2/1970 | Godfrey | |
| 3,594,115 A * | 7/1971 | Wesley et al. | 422/22 |
| 3,687,180 A | 8/1972 | Michalon | |
| 4,457,221 A | 7/1984 | Geren | |
| 4,972,769 A | 11/1990 | Cailliot | |
| 5,256,430 A * | 10/1993 | Suzuki et al. | 426/237 |
| 5,328,403 A | 7/1994 | Long | |
| 5,588,357 A * | 12/1996 | Tomikawa et al. | 99/451 |
| 6,015,580 A | 1/2000 | Mays | |
| 6,168,814 B1 | 1/2001 | Long | |

(Continued)

FOREIGN PATENT DOCUMENTS

| | | |
|---|---|---|
| JP | A-49-64978 | 6/1974 |
| JP | a-52-147559 | 12/1977 |

(Continued)

OTHER PUBLICATIONS

Translation of RU 2083073.*

(Continued)

*Primary Examiner* — Drew E Becker
(74) *Attorney, Agent, or Firm* — Oliff & Berridge, PLC

(57) ABSTRACT

A method of treating food capable of easily softening or pulverizing food in a short time without losing nutrients is provided. A shock wave (SW) generated in a shock wave source is applied to food such as an apple or tea leaves to soften or pulverize the food. A large mechanical load is not necessary, so the food is easily softened or pulverized. Moreover, it is not necessary to heat the food, so the food is softened or pulverized in a short time without losing nutrients in the food due to heat during heating.

11 Claims, 13 Drawing Sheets

(56) References Cited

U.S. PATENT DOCUMENTS

| | | | |
|---|---|---|---|
| 6,254,764 B1 * | 7/2001 | Babington et al. | 205/688 |
| 6,264,543 B1 * | 7/2001 | Garcia et al. | 452/141 |
| 6,669,546 B2 | 12/2003 | Long | |
| 7,510,625 B2 | 3/2009 | Staton et al. | |
| 2003/0194473 A1 * | 10/2003 | Redding et al. | 426/238 |
| 2005/0123648 A1 | 6/2005 | Fujishima et al. | |
| 2005/0191401 A1 | 9/2005 | Long | |
| 2009/0232959 A1 | 9/2009 | McKenna | |

FOREIGN PATENT DOCUMENTS

| | | |
|---|---|---|
| JP | A 05-049413 | 3/1993 |
| JP | A-07-155859 | 6/1995 |
| JP | 10-113123 | 5/1998 |
| JP | A 11-279283 | 10/1999 |
| JP | A 2002-519045 | 7/2002 |
| JP | A 2003-174850 | 6/2003 |
| JP | A 2004-89181 | 3/2004 |
| JP | A 2004-518434 | 6/2004 |
| JP | 2004323448 A * | 11/2004 |
| RU | 2083073 C1 * | 7/1997 |
| WO | WO 00/28830 A1 | 5/2000 |
| WO | WO 2004/045752 A1 | 6/2004 |

OTHER PUBLICATIONS

Translation of JP 2004323448.*
Translation of RU 2083073 C1, Jul. 10, 1997, Atroschenko.*
Translation of JP 2004323448A, Nov. 18, 2004, Okazaki.*
Office Action mailed Aug. 17, 2011 in U.S. Appl. No. 11/886,061.
Office Action issued in U.S. Appl. No. 11/886,061 mailed Dec. 2, 2011.
Kasai M. et al., "Pressure Pretreatment of Vegetables for Controlling the Hardness Before Cooking," 1995, Japanese Society for Food Science and Technology Kaisha, vol. 42, No. 8, pp. 854-601.
Y. Hayasida et al., "Application of Ultra-High Pressure in Food Processing", Reports of Kumamoto Industrial Research Institute, No. 31, pp. 1-8, 1993 (with English-language translation of Summary).

* cited by examiner (A) (B)

(A) (B)

METHOD OF TREATING FOOD AND FOOD OBTAINED BY THIS METHOD

CROSS-REFERENCE TO RELATED APPLICATIONS

This is a Division of application Ser. No. 11/886,061 filed Jan. 29, 2008, which in turn is a U.S. national stage application of PCT/JP2006/305460, filed Mar. 17, 2006. The disclosure of the prior applications is hereby incorporated by reference herein in its entirety.

TECHNICAL FIELD

The present invention relates to a method of treating food for softening or pulverizing food including fruits or vegetables, and food obtained by the method.

BACKGROUND ART

Conventionally, various treating methods are performed on various kinds of food including fruits or vegetables. More specifically, (1) to soften the texture of food, food such as vegetables is heated, (2) to extract a liquid component such as juice, food such as fruits is cut into pieces, (3) to make pickles, food is dehydrated through the use of the osmotic effect of salt to allow seasonings to penetrate the food, and (4) to make powdered green tea, tea leaves are ground into powder. In the case where a liquid component is extracted from very hard food such as sugarcane, after the food is cut into pieces as described above, the pieces of food may be compressed with extremely high pressure.

As the method of treating food, various techniques have been already proposed. More specifically, to easily impregnate food with a liquid or a gas in a short time, a technique of bringing the liquid or the gas into contact with the food in a reduced pressure environment, or a technique of bringing the liquid or the gas in contact with food subjected to decompression treatment is known (for example, refer to Patent Literature 1).

[Patent Literature 1] Japanese Unexamined Patent Application Publication No. 2003-174850

DISCLOSURE OF THE INVENTION

To soften or pulverize food, it is necessary to easily soften or pulverize the food in as short time as possible with consideration given to the treating efficiency of the food. Moreover, in the case where the food is softened or pulverized, if some of nutrients in the food are lost, there is no point to soften or pulverize the food.

However, in methods of treating food in related arts, a large mechanical load (power) is necessary to cut, compress or grind food, so there is an issue that it is difficult to easily soften or pulverize food. Moreover, there is an issue that when food is heated or ground, the thermal decomposition of some nutrients occurs due to heat during heating or frictional heat generated during grinding, thereby the nutrients in the food are lost, and it takes too long time to soften or pulverize the food.

In view of the foregoing, it is an object of the invention to provide a method of treating food for easily softening or pulverizing food in a short time without losing nutrients, and food obtained by the method.

A method of treating food according to a first aspect of the invention includes a step of: softening food including fruits and vegetables by applying a shock wave with a pressure ranging from larger than 5 MPa to 500 MPa to the food.

In the method of treating food according to the first aspect of the invention, the food is softened by applying a shock wave with a pressure ranging from larger than 5 MPa to 500 MPa to the food. Thereby, the food can be softened without using a large mechanical load, so this leads to an increase in ease of the treatment and time reduction. Moreover, heating is not performed, so loss of nutrients due to heat can be prevented.

A method of treating food according to a second aspect of the invention includes a step of: pulverizing food including grains, beans and tea leaves by applying a shock wave with a pressure ranging from 1 MPa to 1 GPa both inclusive to the food.

In the method of treating food according to the second aspect of the invention, the food is pulverized by applying a shock wave to the food. Thereby, the food can be pulverized without using a large mechanical load, so this leads to an increase in ease of the treatment and time reduction. Moreover, the food can be pulverized without grinding the food, so loss of nutrients in the food due to frictional heat generated during grinding can be prevented.

In addition, "food" means not only food typified by the above-described fruits and vegetables, that is, food in a mode that people actually eat (a mode that people see in a kitchen or on a dining table) but also food typified by grains and crops, that is, food in a mode before people actually eat (a mode that producers or the like harvest).

Moreover, "a shock wave" is generated through the use of chemical energy, electrical energy, mechanical energy or the like, and as the chemical energy, for example, energy using, for example, explosion of an explosive or the like is cited, and as the electrical energy, energy using, for example, an electrical pulse or the like is cited, and as the mechanical energy, energy generated by hitting a metallic ball into a liquid, or the like is cited.

In the method of treating food according to the first aspect of the invention, the food may be softened while keeping the original shape of the food, or examples of the food include an apple, a pineapple, a wax gourd, a Japanese radish, ginger, a potato, a Chinese yam, a sweet potato, garlic, a tomato, a yuzu orange, a passion fruit, a dragon fruit, a burdock, a bamboo shoot, a prune, sugarcane, sugar beet and the like.

In the method of treating food according to the second aspect of the invention, examples of the food include tea leaves, azuki beans, coffee beans, a walnut, rice with 5 grains, a shiitake mushroom and the like.

Moreover, in the method of treating food according to the first aspect of the invention, a shock wave may be applied to food in contact with a liquid, thereby while the food is softened, the liquid is allowed to penetrate the food.

Further, in the method of treating food according to the first aspect of the invention, after a shock wave is applied to the food to soften the food, the food may be compressed, or a liquid may be injected into the food.

First food of the invention including vegetables and fruits is subjected to a pressure ranging from larger than 5 MPa to 500 MPa by a shock wave, and is softened, compared to the food before being subjected to the pressure. Moreover, the first food may be softened while keeping its original shape. In addition, "original shape" means not only the case where the shape before applying a shock wave (the original shape) is kept as it is, but also the case where even if the shape is slightly deformed, the shape can be kept for a certain period. Moreover, "softening" means that compared to the state before applying a shock wave, the hardness of the whole food or a part of the food declines.

Second food of the invention including vegetables and fruits is subjected to a pressure ranging from larger than 5 MPa to 500 MPa by a shock wave, wherein the proportion of air bubbles is increased, compared to the food before being subjected to the pressure.

Third food of the invention including vegetables and fruits includes cells with broken cell walls by applying a pressure ranging from larger than 5 MPa to 500 MPa by a shock wave to the food.

In fourth food of the invention including vegetables and fruits, the extraction ratio of a specific nutrient is increased by applying a pressure ranging from larger than 5 MPa to 500 MPa by a shock wave to the food, compared to the food before applying the pressure.

BEST MODE FOR CARRYING OUT THE INVENTION

Preferred embodiments will be described in detail below referring to the accompanying drawings.

[First Embodiment]

Figure 1:
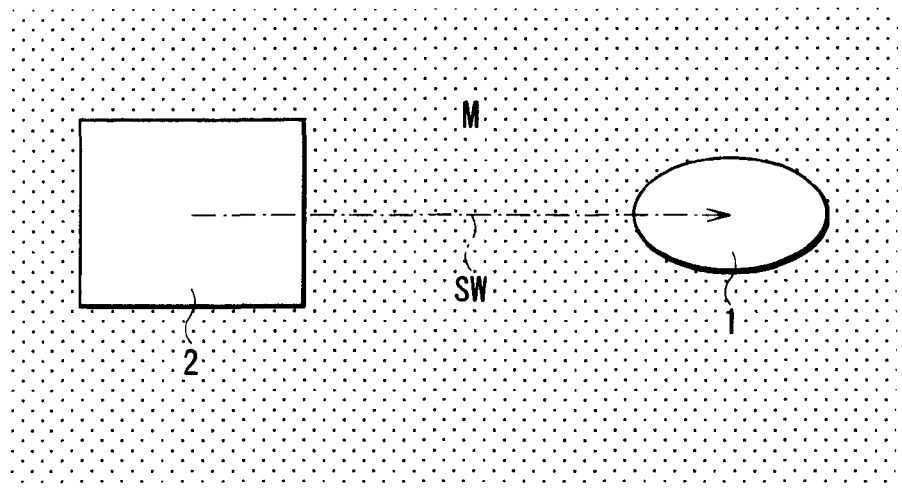
FIG. 1 is an illustration for briefly describing a method of treating food according to a first embodiment of the invention.

At first, referring to FIG. 1, a method of treating food according to a first embodiment of the invention will be described below. FIG. 1 is an illustration for briefly describing the method of treating food.

The method of treating food according to the embodiment is used to soften food. In the method of treating food, as shown in FIG. 1, after a shock wave source 2 is prepared together with food 1, a shock wave SW is generated from the shock wave source 2 in a transmission medium M to be applied to the food 1, thereby the food 1 is softened.

The food 1 is an object to which the shock wave WS is applied from the shock wave source 2. The food 1 includes fruits or vegetables, and more specifically the food 1 includes food of which the texture is generally considered hard. The meaning of "hard" is, for example, the hardness of food typified by sugarcane, an apple or the like, that is, the property of resisting deformation in spite of the application of an external force which is generated in usual handling (that is, a property of being capable of keeping its given external shape), and is opposite to the softness of food typified by tofu, vegetable gelatin or the like, that is, the property of being easily deformed by an external force which is generated in usual handling (that is, the property of being incapable of keeping its given external shape). Examples of the food 1 include fruits typified by apples, pineapples, persimmons or the like, vegetables typified by Japanese radishes, Japanese radish leaves, wax gourds, cucumbers or the like, and grains and crops typified by sweet potatoes, potatoes, sugarcane, ginger, garlic, tea leaves, spices, beans (including various kinds of beans), dried mushrooms or the like. The food 1 may include any other fruits, vegetables, grains and crops except for the above-described series of food (such as apples, Japanese radishes and sweet potatoes), or may include any other food (for example, fishes or the like) except for the above-described fruits, vegetables, grains and crops.

The shock wave source 2 generates the shock wave SW to apply the shock wave SW to the food 1. Examples of the shock wave source 2 include an explosive generating the shock wave SW by an explosion as a shock wave source using chemical energy, an electrical pulse generating device generating the shock wave SW by an electrical pulse as a shock wave source using electrical energy, and a technique of generating the shock wave SW by hitting a metallic ball into a liquid as a technique using mechanical energy. The shock wave source 2 may generate the shock wave SW through the use of any other energy except for the above-described chemical, electrical or mechanical energy.

The transmission medium M is a medium transmitting the shock wave SW (a shock wave transmission medium), that is, a medium for transmitting pressure associated with the shock wave SW (a pressure transmission medium). The transmission medium M is, for example, a compressible fluid such as a gas or a liquid or an elastic body such as rubber.

The shock wave SW is a strong pressure-changeable wave propagating through the transmission medium M at high speed (at a speed exceeding sonic speed), and has the property of momentarily and rapidly changing a physical factor such as pressure, temperature and density. Pressure associated with the shock wave SW, that is, pressure to be applied to the food 1 through the use of the shock wave SW can be freely set depending on the original hardness (before applying the shock wave SW) of the food 1 or the softening state of the food 1 (the softening tendency of the food 1 when applying the shock wave SW), and more specifically, the pressure falls within a range approximately from 1 MPa to 500 MPa. The pressure associated with the shock wave SW is not necessarily limited to a value in the above-described pressure range, and may be a value out of the pressure range.

Figure 2:
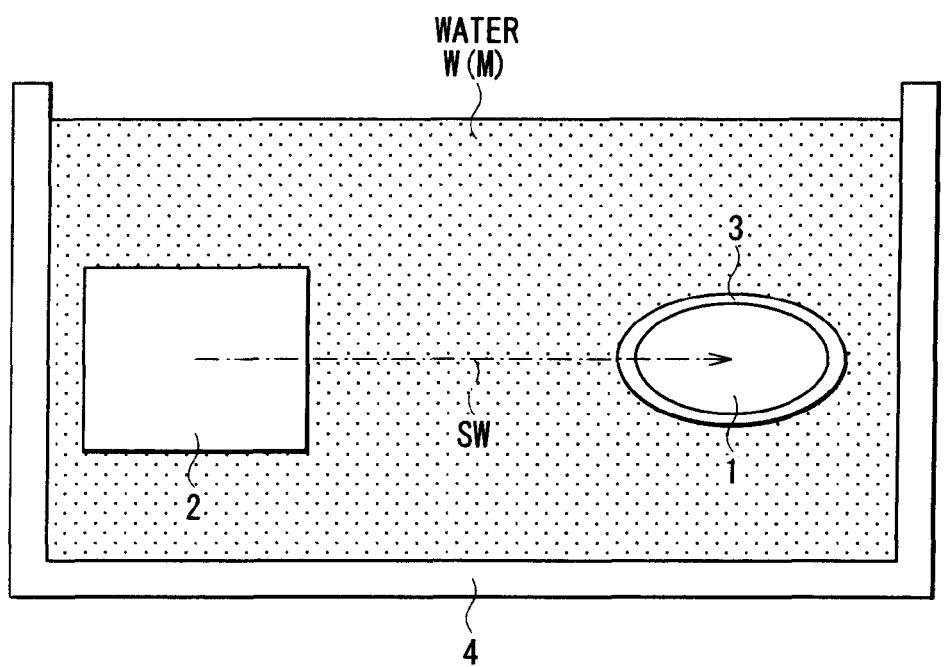
FIG. 2 is an illustration for describing a specific mode of the method of treating food according to the first embodiment of the invention.
Figure 3:
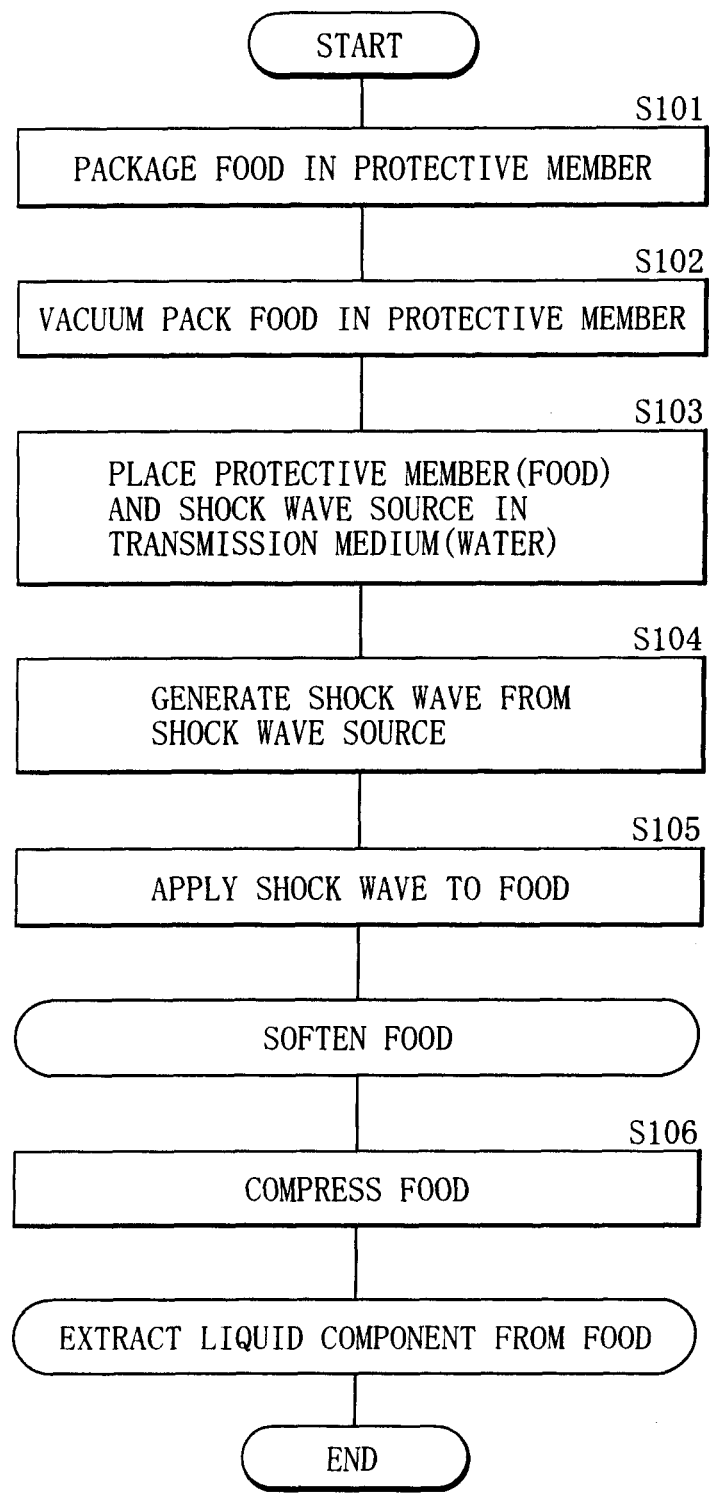
FIG. 3 is a flowchart for describing the flow of steps of the method of treating food according to the first embodiment of the invention.

Next, referring to FIGS. 2 and 3, the method of treating food shown in FIG. 1 will be described in detail below. FIG. 2 is an illustration for describing a specific mode of the method of treating food, and FIG. 3 is an illustration for describing the flow of steps of treating food shown in FIG. 2. The kinds of food 1 and the functions and kinds of the shock wave source 2 have been already described above, so they will not be further described below.

To treat the food 1, for example, as shown in FIG. 2, the following steps are performed. More specifically, at first, after a protective member 3 for protecting the food 1 is prepared together with the food 1, the food 1 is packaged in the protective member 3 (refer to FIG. 3; step S101). In this case, as the food 1, a fruit such as an apple is used. Moreover, as the protective member 3, for example, plastic wrap, that is, a thin transparent film for food wrapping made of a polymer material such as polyethylene is used.

Next, to enhance an effect of protecting the food 1 packaged in the protective member 3, pressure in the interior of the protective member 3 is reduced by a vacuum packing apparatus to vacuum pack the food 1 in the protective member 3 (refer to FIG. 3; step S102).

Next, after the shock wave source 2 is prepared, the food 1 and the shock wave source 2 are placed so as to apply the shock wave SW generated from the shock wave source 2 to the food 1. In this case, for example, after a water tank 4 filled with a liquid (for example, water W) as the transmission medium M is prepared, the food 1 packaged in the protective member 3 is placed together with the shock wave source 2 in the transmission medium M (the water W in the water tank 4) (refer to FIG. 3; step S103). In this case, as described above, the food 1 and the shock wave source 2 are separated from each other at a predetermined distance where the shock wave SW generated from the shock wave source 2 can be applied to the food 1. In this case, for example, as the shock wave source 2, a detonating fuse and an electric detonator are used as an explosive capable of generating the shock wave SW by explosion.

Finally, the shock wave SW is generated from the shock wave source 2 (refer to FIG. 3; step S104), thereby the shock wave SW is applied to the food 1 (refer to FIG. 3; step S105). In this case, for example, the detonating fuse is initiated through the use of the electric detonator, thereby the shock wave SW is generated by the energy of explosion. Thereby, the shock wave SW generated from the shock wave source 2 propagates through the water W as a medium, and the shock wave SW is applied to the food 1 via the protective member 3, so the hardness of the food 1 is changed before and after applying the shock wave SW, that is, the food 1 is softened. For example, the reason why the food 1 is softened is assumed to be that air bubbles in cells or tissues in the food 1 are compressed, and then expanded according to a rapid pressure change associated with the shock wave SW, so cell membranes or cell walls in the food 1 are damaged.

Necessary pressure (pressure associated with the shock wave SW) to soften the food 1 is within a range from 1 MPa to 500 MPa both inclusive, and in the case where an apple is used as the food 1, the pressure is preferably 12.6 MPa or over, and more preferably within a range from 12.6 MPa to 182 MPa both inclusive. Alternatively, in the case where a pineapple is used as the food 1, the pressure is preferably 12.6 MPa or over, and more preferably within a range from 12.6 MPa to 102 MPa both inclusive. Moreover, in the case where a wax gourd is used as the food 1, the pressure is preferably 20 MPa or over, and more preferably within a range from 20 MPa to 184 MPa both inclusive. In addition, in the case of softening fruits and vegetables such as apples while keeping them in a predetermined shape, the pressure is preferably within a range from 37 MPa to 53 MPa both inclusive. The values of the pressure described above are only examples, and the value of the pressure is not limited to the above-described pressure ranges. Thus, the treating of the food 1 is completed.

After treating the food 1, if necessary, an additional treatment may be performed on the treated food 1. In this case, for example, the treated food 1 (the food 1 which is cut into small pieces, if necessary) is compressed (refer to FIG. 3; step S106). Thereby, for example, a liquid component such as juice is extracted from the food 1.

Moreover, as the food 1, any other food except for the above-described apple, pineapple and wax gourd may be used. For example, in the case where a dried mushroom is used as the food 1, the treated food 1 is compressed to extract a liquid component such as an extract of the mushroom from the food 1.

In the method of treating food according to the embodiment, the shock wave SW is applied to the food 1 to soften the food, so the food 1 can be easily softened in a short time without losing nutrients because of the following reasons.

When the shock wave SW is applied to the food 1, as described above, a softening phenomenon using a rapid pressure change associated with the shock wave SW occurs, so the food 1 is softened. In this case, unlike a method of treating food in a related art in which food is cut or compressed by a large mechanical load (power) to soften the food, the food can be softened without using a large mechanical load, so the food 1 can be easily softened.

Moreover, unlike a method of treating food in a related art in which food is heated to soften the food, the food 1 can be softened without heating, so the food 1 can be softened in a short time without losing nutrients in the food 1. In the case where the shock wave SW is applied to the food 1, it is not that the food 1 is not heated at all, and as described above, not only pressure but also temperature are rapidly changed according to the shock wave SW, so the food 1 is considerably heated. However, in this case, the food 1 is only instantaneously heated according to the shock wave SW, that is, the food is not heated for as long a period as nutrients are lost due to heat during heating; therefore, in the method of applying the shock wave SW, nutrients in the food 1 are not lost.

Thus, in the embodiment, the food can be easily softened in a short time without losing nutrients.

In particular, in the embodiment, as described above, the food 1 is not heated for a long period, so the food 1 can be softened without losing its flavor as well as nutrients. The advantage of not losing its flavor is extremely important to soften the food 1 of which the flavor (such as scent) is important such as tea leaves or spices.

Figure 20:
FIG. 20 is a photograph of an apple into which a straw is inserted after applying a shock wave.

Moreover, in the embodiment, at the time of applying the sock wave SW to the food 1, the food 1 is protected with the protective member 3, so the food 1 can be prevented from getting wet with the transmission medium M (for example, a liquid such as the water W), or a foreign matter (for example, a fragment of an explosive or the like) generated during the generation of the shock wave SW can be prevented from being attached to the food 1, or the leakage of a liquid (for example, juice or the like) in the food 1 at the time of applying the shock wave SW can be prevented. Thus, as shown in FIG. 20, for example, in the case where a shock wave treatment is performed on a fruit such as an apple as the food 1, when a straw is inserted into the apple keeping its original shape, juice in the apple can be easily drunk without cutting or squeezing the apple. In this case, the pressure of the shock wave is preferably within a range from 37 MPa to 53 MPa both inclusive. It is because even if a flesh part of the apple is softened to a liquid state (to the extent that the flesh of the apple can be drunk with the straw), a peel part of the apple can keep an unbreakable state. Food in such a form can be used as treated food for elderly people.

Moreover, in the embodiment, in the case where after the shock wave SW is applied to the food 1 to soften the food 1, the food 1 is compressed, compared to the case where food (food cut into small pieces, if necessary) is compressed without softening the food (that is, food having its original hardness is compressed without treating), necessary pressure to compress the food 1 is smaller, and the compression efficiency of the food 1 is improved. Therefore, in the case where the food 1 is compressed to extract a liquid component such as juice from the food 1, the liquid component such as juice can be easily and efficiently extracted from the food 1. Thereby, in the case where the food 1 is compressed through the use of mechanical equipment for compression, the running time of the mechanical equipment (the time of treating the food 1) can be reduced, and the consumption of a fuel (a necessary fuel to treat the food 1) can be reduced, and the amount of waste generated at the time of compressing the food 1 (for example, remaining food 1 which is not compressed, or remaining juice thereof) can be reduced.

In the embodiment, as shown in FIG. 2, the food 1 and the shock wave source 2 are placed in the water W as the transmission medium M, and the shock wave W generated from the shock wave source 2 propagates through the water W as a medium to be applied to the food 1; however, the transmission medium M is not necessarily limited to the water W, and the shock wave SW may be applied to the food 1 in any other liquid except for the water W as the transmission medium M, or the food 1 and the shock wave source 2 may be placed in a gas (for example, air) as the transmission medium M, and the shock wave W generated from the shock wave source 2 may propagate through the gas as a medium to be applied to the food 1. Even in this case, the same effects as those in the embodiment can be obtained.

Figure 4:
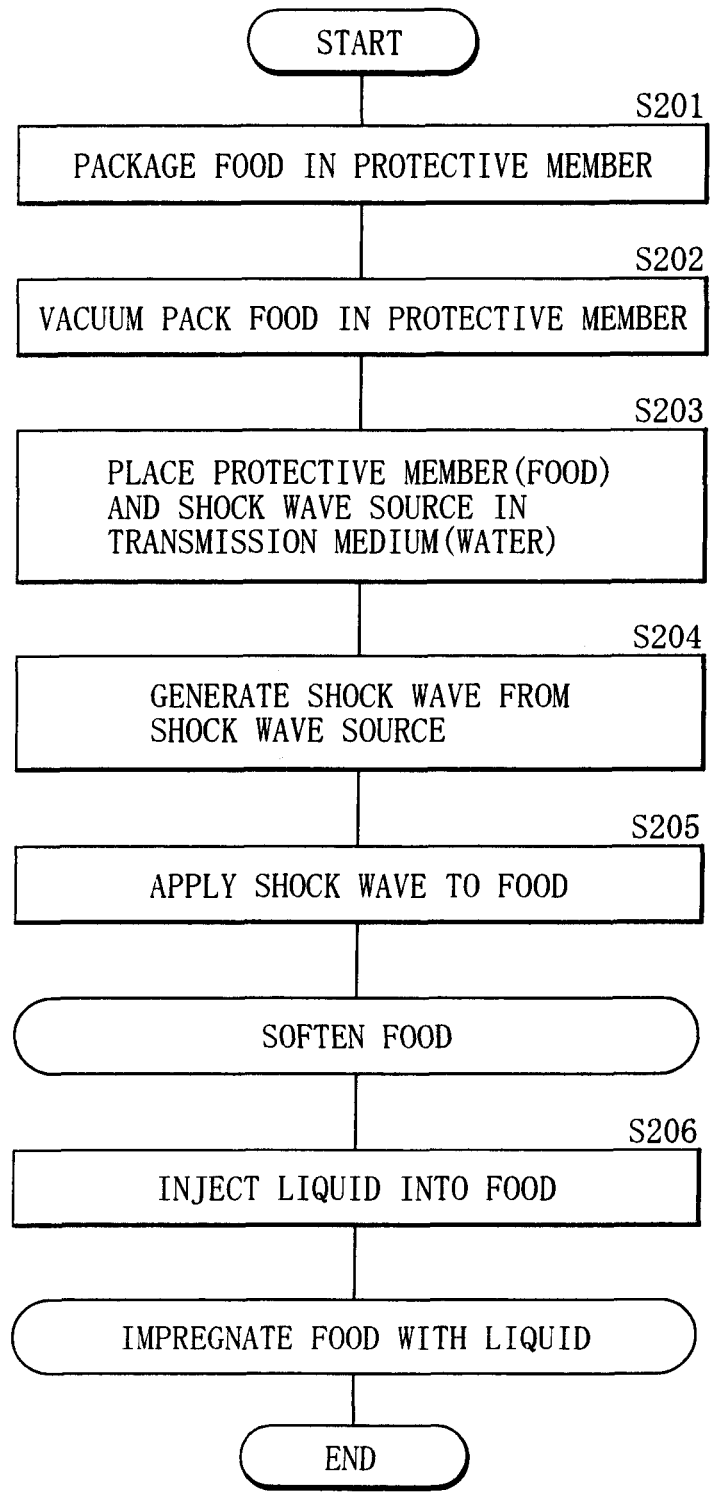
FIG. 4 is a flowchart for describing the flow of steps of the method of treating food according to a modification of the first embodiment of the invention.

Moreover, in the embodiment, as shown in FIG. 3, after the shock wave SW is applied to the food 1 to soften the food 1, the treated food 1 is compressed as an additional treatment; however, the invention is not necessarily limited to this, and, for example, as shown in FIG. 4 corresponding to FIG. 3, a liquid may be injected into the treated food 1 (for example, a Japanese radish or the like) (refer to FIG. 4; step S206). Thereby, the food 1 is impregnated with the liquid. Examples of the liquid include a coloring agent for coloring the food 1, seasonings for penetrating (seasoning) the food 1 and the like. The details of other steps (steps S201 to S205) shown in FIG. 4 are the same as those of the steps (step S101 to S105) described referring to FIG. 3 in the above-described embodiment. In this case, compared to the case where a liquid is injected into food without applying a shock wave (that is, a liquid is injected into food having its original hardness), pressure necessary to inject the liquid into the food 1 is smaller, and the penetration efficiency of the liquid into the food 1 is improved. Therefore, in the case where the liquid is injected into the food 1, the liquid can easily and efficiently penetrate the food 1.

Figure 5:
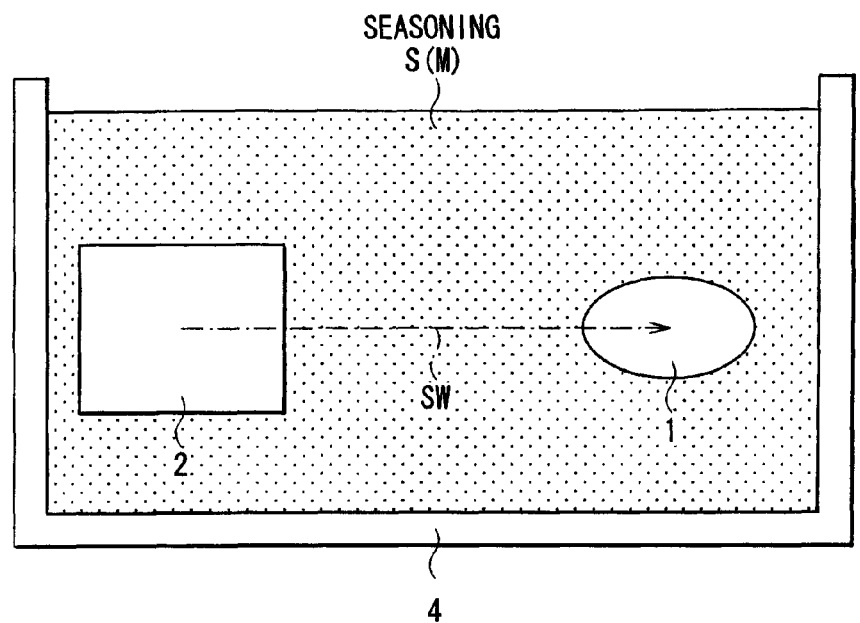
FIG. 5 is an illustration for describing another specific mode of the method of treating food according to the first embodiment of the invention.
Figure 6:
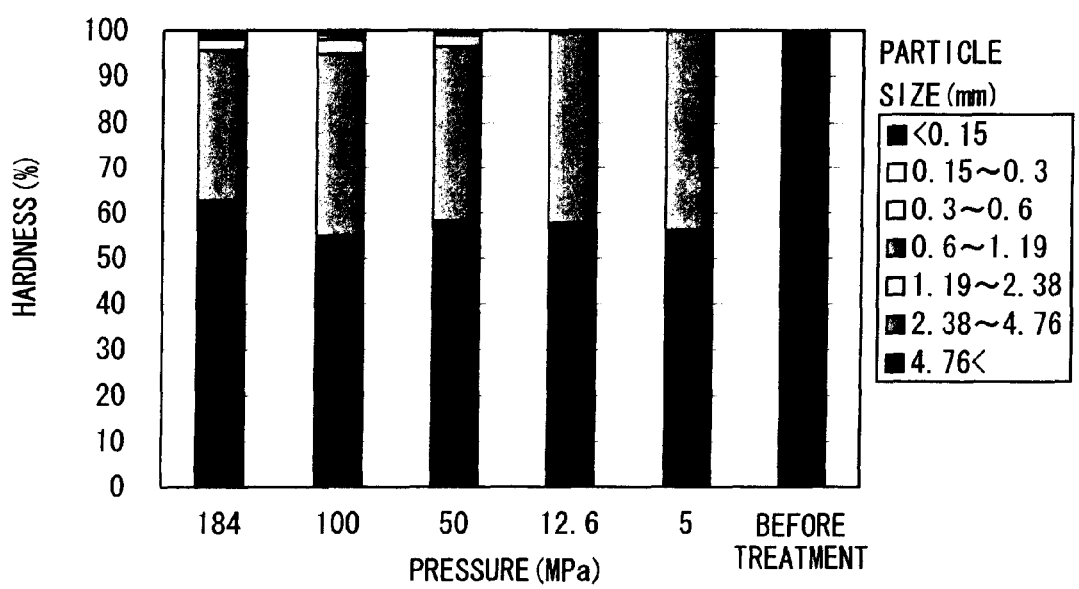
FIG. 6 is a flowchart for describing the flow of steps of the method of treating food shown in FIG. 5.

In addition, in the case shown in FIG. 4, to allow the liquid to penetrate the food 1, after the shock wave SW is applied to the food 1 to soften the food 1, the liquid is injected into the food 1; however, the invention is not necessarily limited to this, and the liquid can penetrate the food 1 through the use of any other steps. More specifically, for example, as shown in FIG. 5 corresponding to FIG. 2 and FIG. 6 corresponding to FIG. 4, the same steps as those in FIG. 4 are performed (refer to FIG. 6; S301 to S303), except that (1) a liquid (for example, a seasoning 5) which is desired to penetrate the food 1 is used as the transmission medium M, (2) the food 1 is not packaged in the protective member 3, and the food 1 which is not packaged is put into the transmission medium M (the seasoning S) to come into contact with the seasoning S, and (3) after the shock wave SW is applied to the food 1, an additional treatment is not performed on the food 1, that is, the shock wave SW is applied to the food 1 while the food 1 comes in contact with the liquid (the seasoning S) as the transmission medium M, thereby the liquid may be allowed to penetrate the food 1 while softening the food 1. Also in this case, the food 1 is softened, and the liquid penetrates the food 1. In this case, in particular, the softening of the food 1 and the penetration of the seasoning S into the food 1 are performed in one step, so the liquid can penetrate the food 1 extremely easily and efficiently. The transmission medium M in this case is not necessarily limited to the seasoning S, and any other liquids except for the seasoning S may be used. As an example, in the case where beans are used as the food 1, and water is used as the transmission medium M, water penetrate the beans, that is, beans absorb water.

[Second Embodiment]

Next, a second embodiment of the invention will be described below.

Figure 7:
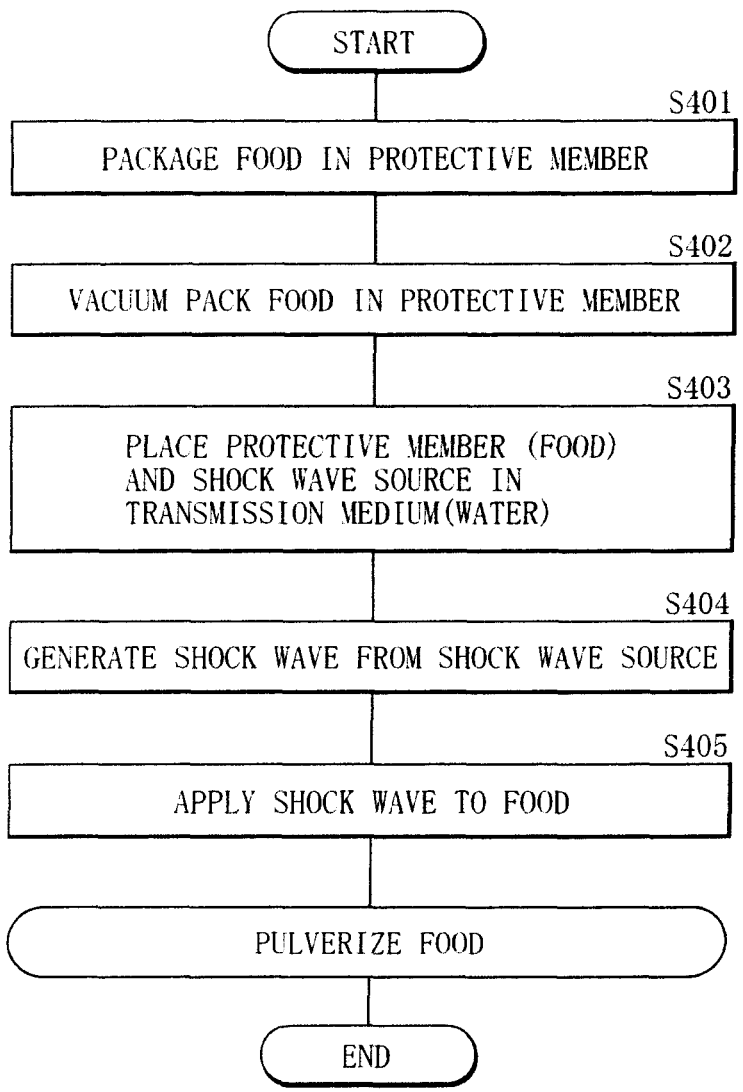
FIG. 7 is a flowchart for describing the flow of steps of a method of treating food according to a second embodiment of the invention.

FIG. 7 is an illustration for describing the flow of steps of a method of treating food according to the embodiment. The method of treating food is used to pulverize food, and as shown in FIG. 1 in the above-described first embodiment, after the shock wave source 2 is prepared together with the food 1, the shock wave SW is generated from the shock wave source 2 in the transmission medium M to be applied to the food 1, thereby the food 1 is pulverized.

In the embodiment, when the food 1 is treated, for example, as shown in FIG. 7, the same steps (refer to FIG. 7; steps S401 to S405) as those (refer to FIG. 3; steps S101 to S105) described referring to FIG. 3 in the first embodiment are performed to apply the shock wave SW to the food 1, except that crops such as tea leaves are used as the food 1, and a shock wave with a pressure ranging from 1 MPa to 1 GPa both inclusive is generated. Thereby, the food 1 is pulverized.

The case where the tea leaves are used as the food 1 is described above; however, any other food 1 except for tea leaves may be used. Examples of "any other food 1" include azuki beans, coffee beans, spices and the like.

In the method of treating food in the embodiment, the shock wave SW is applied to the food 1 to pulverize the food 1, so the food 1 is easily pulverized without using a large mechanical load. Moreover, the food 1 can be pulverized without grinding the food 1, so loss of nutrients in the food 1 due to frictional heat generated during grinding is prevented, and the food 1 can be pulverized in a short time. Therefore, the food 1 can be pulverized in a short time without losing nutrients.

In particular, in the embodiment, as described above, frictional heat is not applied to the food 1, so the food 1 can be pulverized without losing its flavor as well as nutrients. The advantage of not losing its flavor is extremely important to pulverize the food 1 of which the flavor (such as scent) is important such as tea leaves or spices.

The steps, functions, effects and modifications of the method of treating food according to the embodiment are the same as those in the first embodiment except for those described above.

EXAMPLES

Next, examples of the invention will be described below.

Example 1

Food was treated by the following steps through the use of the method of treating food described in the above-described embodiment (refer to FIGS. 2 and 3). At first, as Example 1, after an apple was prepared as the food, and plastic wrap made of polyethylene was prepared as a protective member, the apple was packaged in the plastic wrap, and then the apple packaged in the plastic wrap was vacuum packed. In this case, the apple was cut into halves, and a half apple (165.23 g) was used. Next, to fix the apple as an object receiving the shock wave, a fixing member made of metal was used to fix the apple packaged in the plastic wrap in a cage made of metal. Next, after a detonating fuse and an electric detonator were prepared as a shock wave source, and a water tank filled with water as a transmission medium was prepared, the cage in which the apple packaged in the plastic wrap was fixed and the shock wave source were placed in the water tank (water). In this case, a distance between the apple and the detonating fuse was 27 cm. Next, the detonating fuse was initiated through the use of the electric detonator to generate the shock wave from the detonating fuse. Thereby, the shock wave propagated through water as a medium to be applied to the apple via the plastic wrap. In this case, pressure associated with the shock wave was 44 MPa. Finally, the apple to which the shock wave was applied was pressurized through the use of a button type weight to compress the apple. In this case, the load of the weight was 1947.7 g.

Example 2

Food was treated by the following steps through the use of the method of treating food described as a modification (refer to FIGS. 2 and 4) of the above-described embodiment. At first, as Example 2, after a Japanese radish was prepared as the food, the shock wave was applied to the Japanese radish by the same steps as those in Example 1. In this case, the Japanese radish was sliced into a plate shape (with a thickness of 2.5 cm), and the plate-shaped Japanese radish was used, and pressure associated with the shock wave was 50 MPa. Finally, after a food coloring agent was dissolved in water filled in a bottle made of polycarbonate, the Japanese radish was immersed in the water in which the food coloring agent was dissolved. In this case, the immersing time was 3 hours. Moreover, as Example 2-2, soybeans were used as food, and the food was treated as in the case of Example 2.

Comparative Example 1

An apple was prepared by the same steps as those in Example 1, except that the shock wave was not applied to the apple. In this case, another half (171.20 g) of the apple cut into halves in Example 1 was used, and the load of the weight was 1915.3 g.

Comparative Example 2

A Japanese radish was prepared by the same steps as those in Example 2, except that the shock wave was not applied.

When various properties of food obtained by performing the above-described steps in Examples 1 and 2 and food obtained by performing the steps of Comparative Examples 1 and 2 were examined, the following results were obtained.

At first, the states of the food of Example 1 and the food of Comparative Example 1 were examined. In this case, the appearance of food was observed, and the tactile impression of food was examined, thereby the hardness and texture of food were determined.

In the food of Comparative Example 1, as expected, the original hardness of the apple was maintained, and the texture of the apple was not changed. On the other hand, in the food of Example 1, the apple was softened, and the texture of the apple was changed. Therefore, it was confirmed that in the method of treating food in the invention, the food could be softened by applying the shock wave to the food.

Figure 8:
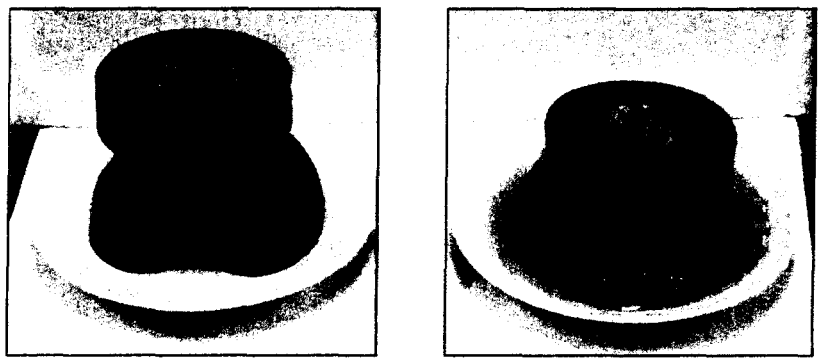
FIG. 8 is photographs showing states of extracting juice from food of Example 1 and food of Comparative Example 1.

Next, when the states of extracting juice by compressing the food of Example 1 and the food of Comparative Example 1 were examined, results shown in FIG. 8 were obtained. FIG. 8 shows the states of extracting juice from the food of Example 1 and the food of Comparative Example 1, and (A) shows the food of Comparative Example 1 and (B) shows the food of Example 1.

It was obvious from the results shown in FIG. 8 that in the food (A) of Comparative Example 1, in spite of pressurizing the apple, juice was not extracted from the apple. On the other hand, in the food (B) of Example 1, the apple was crushed by pressurizing the apple, so 112.81 g of juice was extracted from the apple. It meant that in the food of Comparative Example 1, the original hardness of the apple was maintained, so the juice was not extracted only by pressurizing the apple with the load (1915.3 g) of the weight, but on the other hand, in the food of Example 1, the apple was softened, so juice was extracted only by pressurizing the apple with the load (1947.7 g) of the weight. Therefore, it was confirmed that in the method of treating food according to the invention, the food could be softened to the extent that a liquid component such as juice could be extracted from the food by pressurizing the food with a smaller load.

Figure 9:
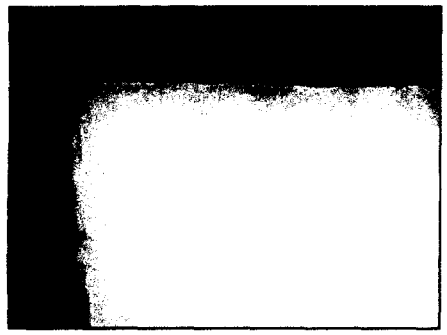
FIG. 9 is photographs showing states in which a food coloring agent penetrates food of Example 2 and food of Comparative Example 2.
Figure 9:
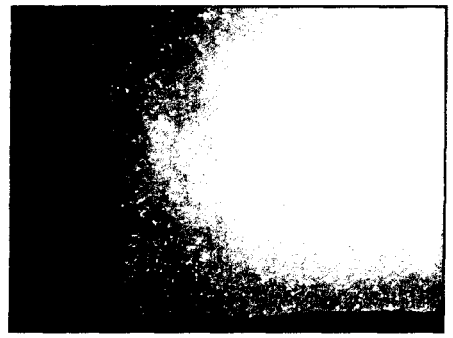

Next, when the states of the food of Example 2 and the food of Comparative Example 2 were examined, results shown in FIG. 9 were obtained. FIG. 9 shows the penetration states of a food coloring agent into the food of Example 2 and the food of Comparative Example 2, and (A) shows the food of Comparative Example 2 and (B) shows the food of Example 2. In this case, the appearance of food was observed to determine the penetration state of the food coloring agent into food.

It was obvious from the results shown in FIG. 9 that in the food (A) of Comparative Example 2, only a portion close to the edge of the Japanese radish was slightly colored with red, that is, the food coloring agent did not sufficiently penetrate the Japanese radish. On the other hand, in the food (B) of Example 2, a broad area including not only a portion close to the edge of the Japanese radish but also a portion inside the edge was colored with red, that is, the food coloring agent sufficiently penetrated the Japanese radish. It meant that in the food of Comparative Example 1, the original hardness of the Japanese radish was maintained, so it was difficult for the food coloring agent to penetrate the Japanese radish only for a set immersing time (3 hours), but on the other hand, in the food of Example 2, the Japanese radish was softened, so the food coloring agent easily penetrated the Japanese radish only for a set immersing time (3 hours). In addition, when the food taken out of the bottle made of polycarbonate was observed while the food was left under atmospheric pressure, the state of the food of Comparative Example 2 which was left standing was not changed, that is, while the food was left standing, the external shape of the food was maintained, but on the other hand, the state of the food of Example 2 which was left standing was changed, more specifically, the Japanese radish was deformed under its own weight, thereby water was gradually leaked from the Japanese radish. At that time, when the food was lightly pushed with a finger, in the food of Comparative Example 2, the Japanese radish was not deformed, and the food coloring agent (the food coloring agent dissolved in water) was hardly leaked from the Japanese radish, but on the other hand, in the food of Example 2, the Japanese radish was easily deformed with fingertip pressure like a sponge, and a large amount of the food coloring agent (the food coloring agent dissolved in water) was leaked from the Japanese radish. Moreover, in the soybeans of Example 2-2, the softening and the water injection property of the food were observed in the same manner. Therefore, it was confirmed that in the method of treating food according to the invention, the food could be softened in a shorter time to the extent that a liquid such as a food coloring agent (a food coloring agent dissolved in water) could be injected into the food.

Figure 10:
FIG. 10 is micrographs of surface states of the food of Example 2 and the food of Comparative Example 2.
Figure 10:

In particular, when the surface states of the food of Example 2 and the food of Comparative Example 2 were examined, results shown in FIG. 10 were obtained. FIG. 10 shows the surface states of the food of Example 2 and the food of Comparative Example 2, and (A) shows the food of Comparative Example 2 and (B) shows the food of Example 2. In this case, the surface state of food was observed with a binocular stereomicroscope.

It was obvious from the results shown in FIG. 10 that in the food (A) of Comparative Example 2, air bubbles were not observed on the surface of the Japanese radish, but on the other hand, in the food (B) of Example 2, a large number of air bubbles were observed on the surface of the Japanese radish. It meant that the air bubbles on the surface was generated by the expansion of air bubbles in the Japanese radish under the influence of the shock wave, so the expansion of air bubbles was a factor of softening the Japanese radish. Therefore, it was confirmed that in the method of treating food according to the invention, when the shock wave was applied to the food, a large number of air bubbles were generated in the food, so the food was softened on the basis of the presence of air bubbles.

Examples 3-1 to 3-4

Next, as Examples 3-1 to 3-4, the hardness of food in the case where the pressure of an applied shock wave was changed step by step was measured by a durometer (according to ASTM D 2240). As the food, an apple, a flesh part of a pineapple, and a core part of a pineapple, a wax gourd (a skin-side part) were used in Examples 3-1, 3-2, 3-3 and 3-4, respectively. The method of generating and applying a shock wave was performed as in the case of Example 1. The pressure of the shock wave was changed by adjusting a distance between the detonating fuse and the food. The hardness after applying a shock wave under each pressure was determined as a ratio (%) to the hardness before applying the shock wave, and the results are shown in Tables 1 to 4 and FIGS. 11 to 14.

TABLE 1

| PRESSURE (MPa) | | | | | | | | | | | | | BEFORE TREATING |
|---|---|---|---|---|---|---|---|---|---|---|---|---|---|
| | 181.5 | 101.3 | 72 | 56.6 | 46.9 | 40.2 | 31.6 | 26.2 | 22.4 | 19.7 | 17.6 | 12.6 | |
| HARDNESS (%) | 8.86 | 18.92 | 23.51 | 21.32 | 32.43 | 29.59 | 46.09 | 50.42 | 75.36 | 72.99 | 93.67 | 91.53 | 100 |

TABLE 2

| PRESSURE (MPa) | | | | | | | | BEFORE TREATING |
|---|---|---|---|---|---|---|---|---|
| | 101.3 | 56.6 | 40.2 | 31.6 | 26.2 | 22.4 | 12.6 | |
| HARDNESS (%) | 39.93 | 53.17 | 60.33 | 77.16 | 75.78 | 92.20 | 94.56 | 100 |

TABLE 3

| PRESSURE (MPa) | | | | | | | | BEFORE TREATING |
|---|---|---|---|---|---|---|---|---|
| | 101.3 | 56.6 | 40.2 | 31.6 | 26.2 | 22.4 | 12.6 | |
| HARDNESS (%) | 88.74 | 98.59 | 98.46 | 99.46 | 94.48 | 98.74 | 95.87 | 100 |

TABLE 4

| | PRESSURE (MPa) | | | | | | BEFORE TREATING |
|---|---|---|---|---|---|---|---|
| | 184 | 120 | 55 | 27 | 22 | 20 | |
| HARDNESS (%) | 59.08 | 76.67 | 86.88 | 89.13 | 88.58 | 92.17 | 100 |

Figure 11:
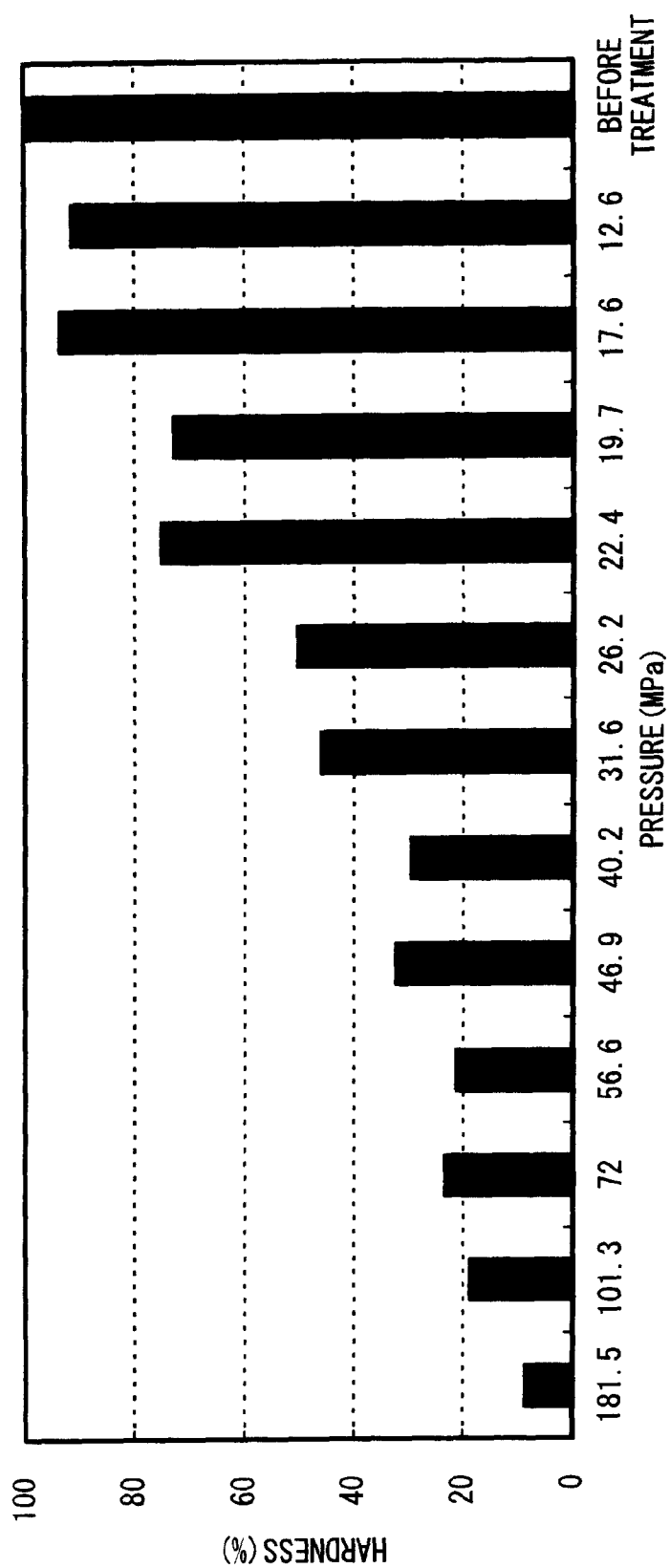
FIG. 11 is a plot showing a relationship of hardness to pressure in food of Example 3-1.

As shown in Table 1 and FIG. 11, it was found out that in the apple of Example 3-1, as the pressure increased, the hardness was decreased, so softening proceeded. Thereby, for example, it was found out that, for example, when desired hardness was 50% or less, the apple could be easily softened by applying a shock wave with a pressure of 26 MPa or over, and when desired hardness was 30% or less, the apple could be easily softened by applying a shock wave with a pressure of 40 MPa or over.

Figure 12:
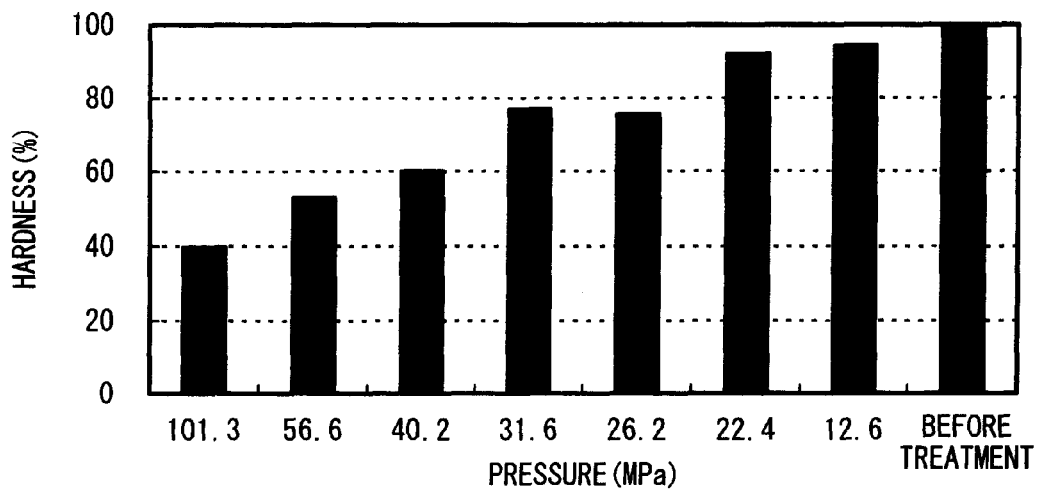
FIG. 12 is a plot showing a relationship of hardness to pressure in food of Example 3-2.
Figure 13:
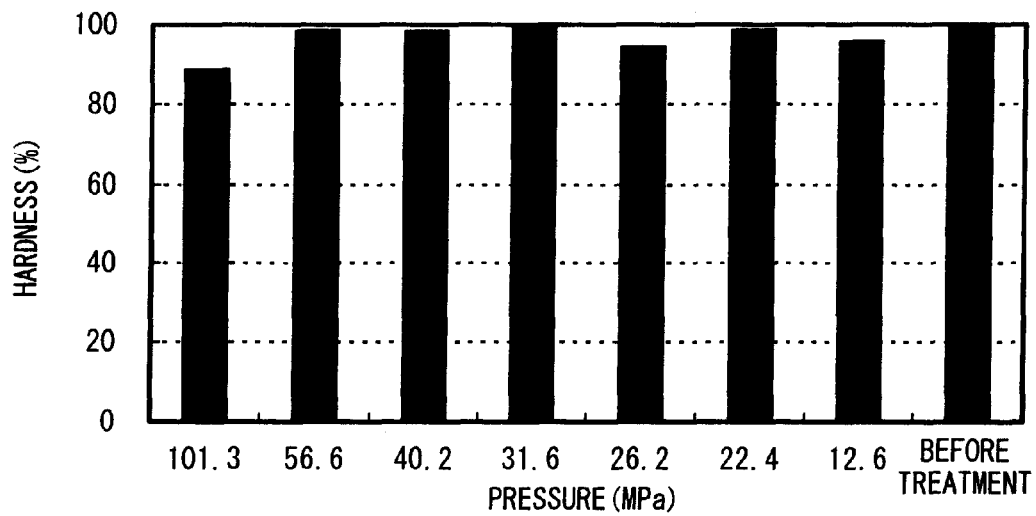
FIG. 13 is a plot showing a relationship of hardness to pressure in food of Example 3-3.

As shown in Table 2 and FIG. 12, it was found out that in the flesh part of the pineapple of Example 3-2, as the pressure increased, the hardness tended to gradually decrease; however, the obtained result was not as remarkable as that in the apple. Moreover, as shown in Table 3 and FIG. 13, it was found out that the core part of the pineapple of Example 3-3 showed little tendency to be softened under a smaller pressure than 100 MPa, so at least a pressure of 100 MPa or over was necessary.

Figure 14:
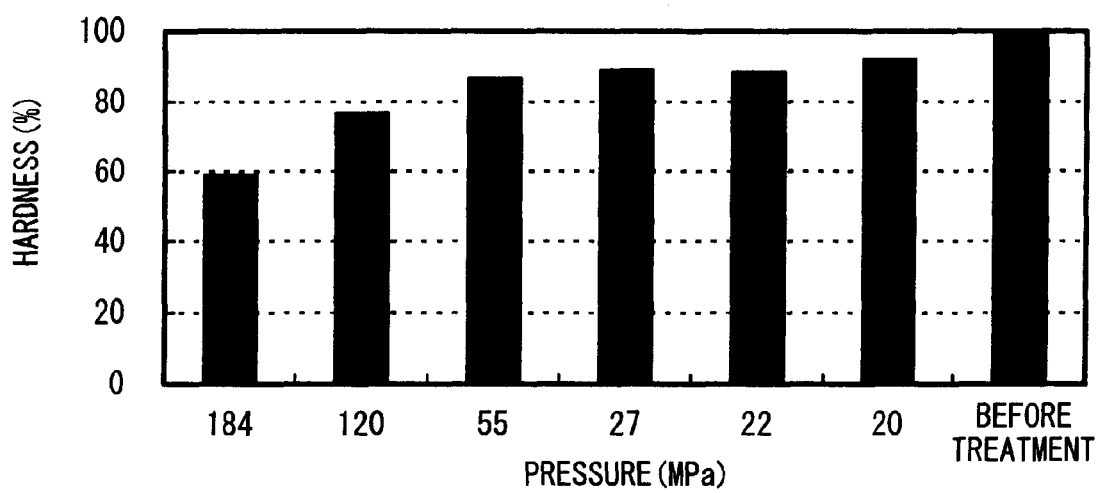
FIG. 14 is a plot showing a relationship of hardness to pressure in food of Example 3-4.

As shown in Table 4 and FIG. 14, it was found out that in the wax gourd of Example 3-4, as the pressure increased, the hardness tended to gently decrease, and, for example, when a hardness of 60% or less was desired, a shock wave with a pressure of approximately 180 MPa or over was necessary.

It was shown from the results of Examples 3-1 to 3-4 that when the pressure of the shock wave was adjusted, the food could be softened to have desired hardness, and specifically the apple had a pronounced tendency to do so. Moreover, internal air bubbles (refer to FIG. 10) which were observed in the softened Japanese radish in Example 1 were observed in the food of Examples 3-1 to 3-4 in the same manner.

Examples 4-1 to 4-4

Next, as Examples 4-1 to 4-4, the food was pulverized by the application of a shock wave to analyze the particle size of the food before and after treating. As the food, tea leaves, azuki beans, wheat and coffee beans were used in Examples 4-1, 4-2, 4-3 and 4-4, respectively. The method of generating and applying a shock wave was performed as in the case of Example 1. Alternatively, when the food was placed in the water tank, the food might be sealed in a polycarbonate bottle (a pressure-proof bottle). Moreover, the pressure of the shock wave was changed by adjusting a distance between the detonating fuse and the food.

To analyze the particle size, after the shock wave treatment, sieves with a hole diameter of 0.15 mm, 0.3 mm, 0.6 mm, 1.19 mm, 2.38 mm and 4.76 mm were used to measure the particle size (mm) of each food after the shock wave treatment, and the weight (g) and the weight ratio (%) of each food in each particle size were determined. The results are shown in Tables 5 to 8 and FIGS. 15 to 18.

TABLE 5

| PARTICLE SIZE (mm) | PRESSURE (MPa) | | | | | BEFORE TREATMENT |
|---|---|---|---|---|---|---|
| | 184 | 100 | 50 | 12.6 | 5 | |
| LARGER THAN 4.76 | 0 | 0 | 0.03 | 1.22 | 0.99 | 0.27 |
| 2.38 to 4.76 | 3.62 | 2.14 | 5.17 | 9.94 | 10.11 | 8.67 |
| 1.19 to 2.38 | 11.43 | 16.4 | 25.48 | 28.94 | 25.98 | 28.67 |
| 0.6 to 1.19 | 22.77 | 27.31 | 25.36 | 20.68 | 12.52 | 16.08 |
| 0.3 to 0.6 | 18 | 16.41 | 9.32 | 3.83 | 3.41 | 1.58 |
| 0.15 to 0.3 | 10.9 | 7.23 | 2.31 | 0.4 | 0.32 | 0.14 |
| SMALLER THAN 0.15 | 1.87 | 0.89 | 0.22 | 0.04 | 0.03 | 0.02 |
| TOTAL (g) | 68.59 | 70.38 | 67.89 | 65.05 | 53.36 | 55.43 |

TABLE 6

| PARTICLE SIZE (mm) | PRESSURE (MPa) | | | | | BEFORE TREATMENT |
|---|---|---|---|---|---|---|
| | 184 | 100 | 50 | 12.6 | 5 | |
| LARGER THAN 4.76 | 78.76 | 69.22 | 73.8 | 71.68 | 69.3 | 126 |
| 2.38 to 4.76 | 41.27 | 50.4 | 48.46 | 51.94 | 54.22 | 0 |
| 1.19 to 2.38 | 3 | 3.85 | 3.06 | 0.5 | 0 | 0 |
| 0.6 to 1.19 | 1.52 | 1.65 | 0.92 | 0.05 | 0 | 0 |
| 0.3 to 0.6 | 0.61 | 0.63 | 0.32 | 0.03 | 0 | 0 |
| 0.15 to 0.3 | 0.21 | 0.27 | 0.09 | 0.02 | 0 | 0 |
| SMALLER THAN 0.15 | 0.08 | 0.11 | 0.05 | 0 | 0 | 0 |
| TOTAL (g) | 125.45 | 126.13 | 126.7 | 124.22 | 123.52 | 126 |

TABLE 7

| PARTICLE SIZE (mm) | PRESSURE (MPa) | | | | BEFORE TREATMENT |
|---|---|---|---|---|---|
| | 184 | 100 | 12.6 | 5 | |
| LARGER THAN 4.76 | 0.8 | 2.155 | 0 | 0 | 0 |
| 2.38 to 4.76 | 86.01 | 84.515 | 124.03 | 125.4 | 87.5 |
| 1.19 to 2.38 | 0.48 | 0.48 | 0.26 | 0.14 | 0.22 |
| 0.6 to 1.19 | 0.29 | 0.175 | 0.04 | 0 | 0 |
| 0.3 to 0.6 | 0.07 | 0.095 | 0 | 0 | 0 |
| 0.15 to 0.3 | 0.035 | 0.025 | 0 | 0 | 0 |
| SMALLER THAN 0.15 | 0.01 | 0.015 | 0 | 0 | 0 |
| TOTAL (g) | 87.695 | 87.46 | 124.33 | 125.54 | 87.72 |

TABLE 8

| PARTICLE SIZE (mm) | PRESSURE (MPa) | | | | BEFORE TREATMENT |
|---|---|---|---|---|---|
| | 37 | 31.2 | 26.5 | 12.6 | |
| LARGER THAN 4.76 | 12.03 | 28.78 | 51.2 | 37.67 | 73.87 |
| 2.38 to 4.76 | 19.84 | 16.43 | 2.18 | 5.39 | 0 |
| 1.19 to 2.38 | 14.58 | 6.38 | 0.3 | 1.76 | 0 |
| 0.6 to 1.19 | 5.43 | 1.87 | 0.04 | 0.53 | 0 |
| 0.3 to 0.6 | 1.6 | 0.38 | 0 | 0.17 | 0 |
| 0.15 to 0.3 | 0.2 | 0.01 | 0 | 0.05 | 0 |
| SMALLER THAN 0.15 | 0 | 0 | 0 | 0.01 | 0 |
| TOTAL (g) | 53.68 | 53.85 | 53.72 | 45.58 | 73.87 |

Figure 15:
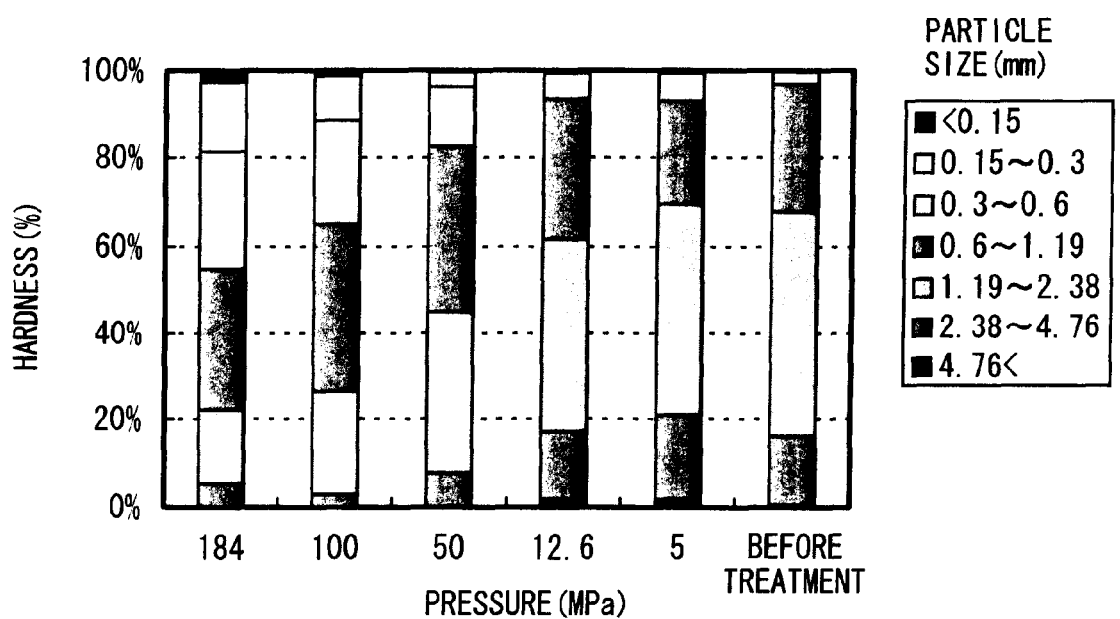
FIG. 15 is a plot showing a relationship of hardness to pressure in food of Example 4-1.

As shown in Table 5 and FIG. 15, it was found out that in the tea leaves of Example 4-1, in a state before the shock wave treatment, the tea leaves with a particle size of 1.19 to 2.38 made up 50% or over of the total; however, when the shock wave with pressure was applied, the particle size was reduced, and as the pressure further increased, the weight of the tea leaves with a smaller particle size was gradually increased. Thereby, for example, when a shock wave with a pressure of 50 MPa was applied, the food pulverized into particles with a particle size of approximately 0.15 to 0.3 could be obtained in 3.4% of the total. Alternatively, when a shock wave with a pressure of 184 MPa was applied, the food pulverized into particles with a particle size of 0.15 or less could be obtained in 2.73% of the total.

Figure 16:
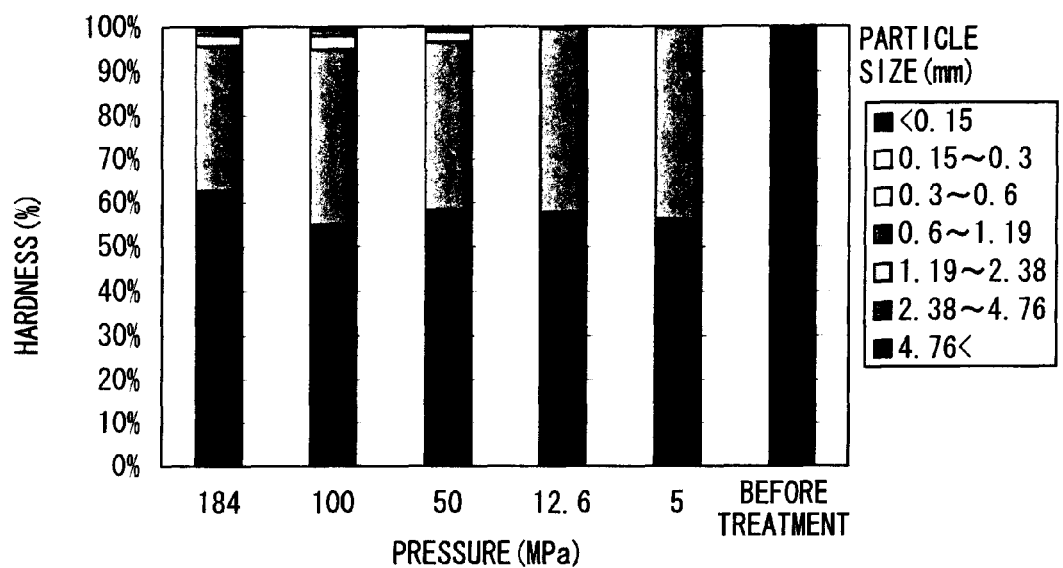
FIG. 16 is a plot showing a relationship of hardness to pressure in food of Example 4-2.

As shown in Table 6 and FIG. 16, it was found out that in azuki beans of Example 4-2, in a state before the shock wave treatment, the particle size was 4.76 or over; however, when a shock wave with a pressure of 5 MPa was applied, approximately a half of the total azuki beans was pulverized into particles with a particle size of 2.38 to 4.76, and after that, as the pressure increased, the particle size was slightly reduced.

Figure 17:
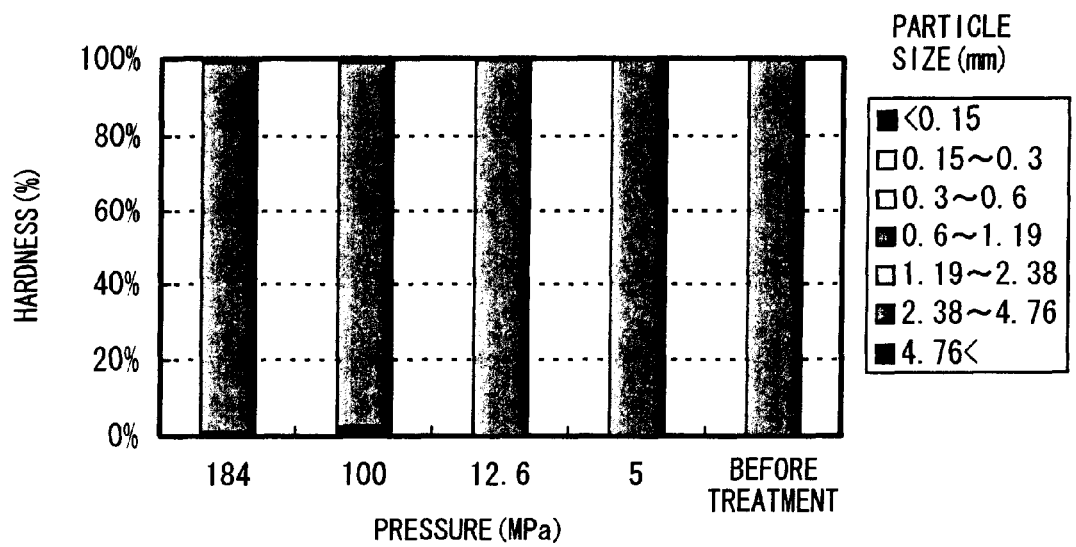
FIG. 17 is a plot showing a relationship of hardness to pressure in food of Example 4-3.

As shown in Table 7 and FIG. 17, in the wheat of Example 4-3, in a state before and after the shock wave treatment using a pressure of approximately 0 MPa to 184 MPa, there was no great difference in particle size, so it was expected that a larger pressure was necessary to pulverize wheat. However, it was confirmed that hulls were removed from the wheat.

Figure 18:
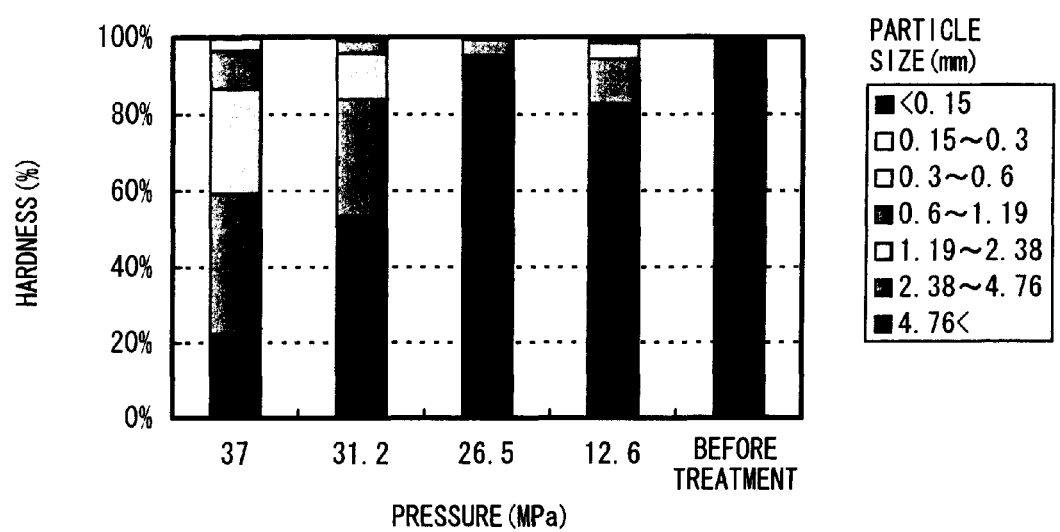
FIG. 18 is a plot showing a relationship of hardness to pressure in food of Example 4-4.

As shown in Table 8 and FIG. 18, in the coffee beans of Example 4-4, in a state before the shock wave treatment, the particle size was 4.76 or over; however, when a shock wave with a pressure of 12.6 MPa was applied, approximately 20% of the total coffee beans were pulverized. It was found out that as the pressure increased, pulverization gradually proceeded, and when a shock wave with a pressure of 31.2 MPa or over was applied, approximately a half of the total coffee beans were pulverized. Moreover, when coffee beans keeping its original shape were selected from coffee beans to which the shock wave was applied to be put into water, and the coffee beans were kept still for 1 hour, a change in water color was observed. It was considered that it was because even though a large change was not observed on the surfaces of the coffee beans, fine pulverization occurred in the coffee beans, so extractability was improved.

It was found out from the results of Examples 4-1 to 4-4 that when a shock wave was applied to the food, or when the pressure of the shock wave was adjusted, the food could be pulverized into particles with a desired particle size, and specifically tea leaves, azuki beans and coffee beans were effectively pulverized.

Example 5

Next, as Example 5, the Following Experiment was Performed to confirm whether nutrients contained in food were changed before and after the shock wave treatment.

At first, as the food, an apple was used, and the shock wave treatment was performed by the same method as that in Example 1. After that, juice was obtained from the treated apple, and nutrients in the juice were measured. At that time, the pressure of the shock wave was set to 50 MPa, and the sugar content (%), acidity (%), pH, the total pectin content (%), the water-soluble pectin content (%), the polyphenol content (mg %, reference material; catechin), the sodium content (mg %), the potassium content (mg %) and the calcium content (mg %) were measured.

Figure 19:
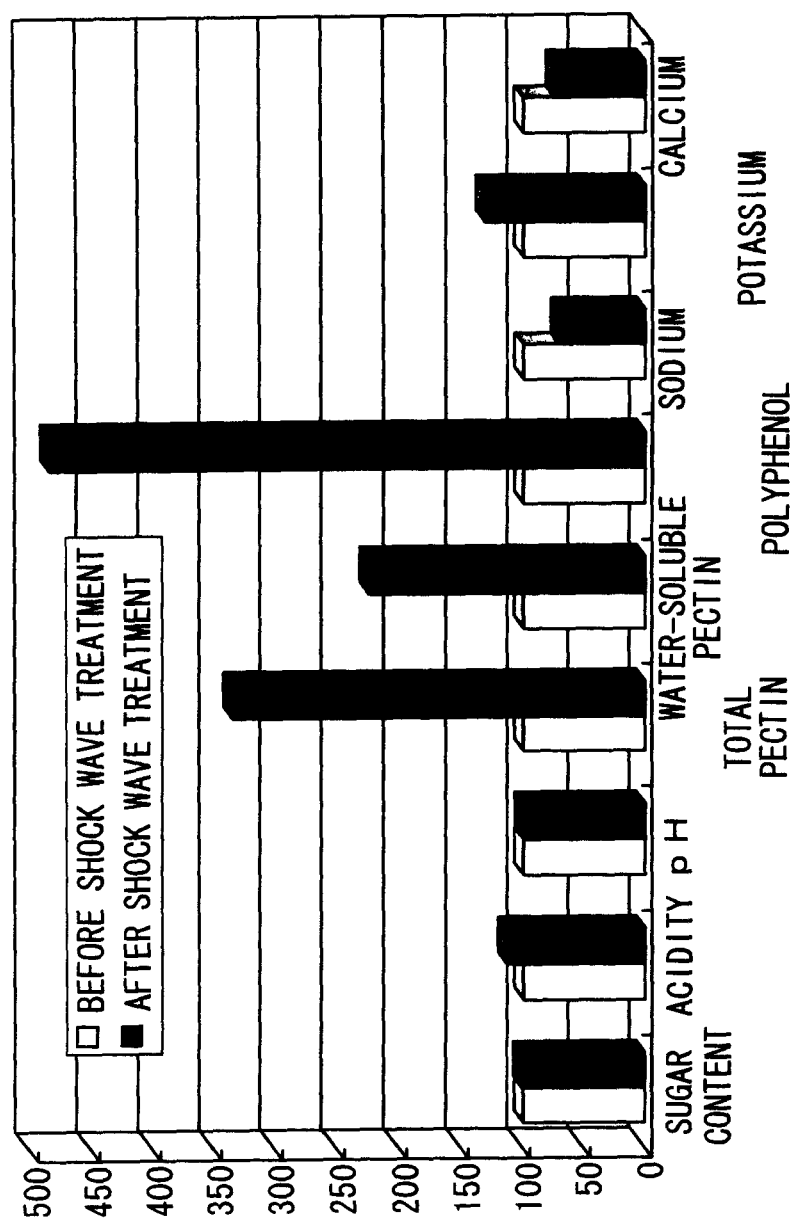
FIG. 19 is a plot showing changes in nutrients before and after a shock wave treatment in Example 5.

On the other hand, as a sample before the shock wave treatment, juice was extracted from an apple to which a shock wave was not applied, and nutrients were measured. The measurement results are shown in Table 9 and FIG. 19. In FIG. 19, component values (%) after the treatment relative to component values before the treatment are shown in the case where each component value before the treatment was 100%.

TABLE 9

| | Sugar CONTENT (%) | ACIDITY (%) | pH (%) | TOTAL PECTIN | WATER-SOLUBLE PECTIN | POLYPHENOL (mg %) | SODIUM (mg %) | POTASSIUM (mg %) | CALCIUM (mg %) |
|---|---|---|---|---|---|---|---|---|---|
| BEFORE SHOCK WAVE TREATMENT | 12 | 0.22 | 4.01 | 0.014 | 0.004 | 15.5 | 12.4 | 83.6 | 2.7 |
| AFTER SHOCK WAVE TREATMENT | 12.1 | 0.25 | 4 | 0.047 | 0.009 | 75.2 | 8.7 | 109.8 | 2 |

As shown in Table 9 and FIG. 19, sodium and calcium were slightly reduced after the shock wave treatment; however, a large change in the sugar content, the acidity and pH before and after the shock wave treatment was not observed. On the other hand, the total pectin, water-soluble pectin, polyphenol and potassium were increased after the treatment, compared to those before the treatment, and in particular, polyphenol was largely increased. It was assumed that it was because each cell wall in the apple was damaged by the shock wave, thereby polyphenol was emitted from cells. Thus, it was found out that even if the shock wave treatment using a pressure was performed, nutrients in the food were not particularly reduced. Moreover, it was found out that in the case where juice was obtained from the apple, when the shock wave treatment was used, in particular, extraction efficiency of nutrients such as polyphenol was improved, and it was shown that the shock wave treatment was an effective means in terms of nutrients of food.

Examples 6-1 to 6-3

In the above-described Example 5, it was shown that in the case where an apple was used as the food, the polyphenol content in nutrients was largely increased by the shock wave treatment, and as Examples 6-1 to 6-3, the following experiment was performed to confirm whether such an effect was dependent on the kind of apple.

At first, as samples of apples, a Sun Fuji apple, a Jonagold apple and an Ohrin apple were used in Examples 6-1, 6-2 and 6-3, respectively, and juice was obtained from each apple before and after shock wave treatment as in the case of Example 5. After 10 ml of the juice was dilated two-fold with distilled water, hot water extraction was performed for 1 hour at a temperature of 105° C., and the diluted juice was filtered. At that time, the weight of each apple before and after extracting juice was measured, and the juice yield (juice yield (%)= ((the weight before extracting juice−the weight after extracting juice)/weight before extracting juice)×100) was determined. The results are shown in Table 10.

Next, 10 ml of a 20% sodium carbonate solution, 50 ml of distilled water, 5 ml of a phenol reagent were added to the formed juice diluent, and they were mixed well to form a mixture solution, and the mixture solution was kept still for 15 hours. As the phenol reagent, a reagent including sodium tangstate dehydrate ($Na_2WO_4.2H_2O$), phosphomolybdic acid ($H_3PO_4.12MoO_2$), phosphoric acid ($H_3PO_4$) and water ($H_2O$) was used. In a method of using the reagent, through the use of the reducing power of a phenolic hydroxyl group in alkali, a blue color (wavelength; 725 to 760 nm) generated by the reduction of molybdic acid was measured by colorimetry, and the method was suitable for quantitative determination of an extremely small amount of the whole polyphenol.

Next, a photograph of each mixture solution kept still for 15 hours was taken, and a 1-cm image was cut out of the photograph, and the image was treated. At that time, the resolution of the image was changed to 200 pixels/cm, and four colors of cyan, magenta, yellow and black were picked up by a color pick up tool, and the ratio was determined. Among the four colors, cyan was the indicator of the polyphenol content, so variations in the ratio of cyan were measured.

As shown in Table 10, in each of the apples of Examples 6-1 to 6-3, the juice amount obtained from the apple subjected to the shock wave treatment was twice or more as large as that obtained from the apple not subjected to the shock wave treatment. It was shown from the results that when the shock wave treatment was performed, juice could be efficiently extracted from food.

Moreover, it was found out that in the Sun Fuji apple of Example 6-1 and the Ohrin apple of Example 6-3, the ratio of cyan measured by image treating after the shock wave treatment was higher than that before the shock wave treatment, and the amount of polyphenol contained in the juice was increased.

Examples 7-1 to 7-18

Next, Whether or not to Soften or Pulverize Food Except for the above-described food by the same steps as those in Example 1 was determined. As the food, ginger in Example 7-1, a potato in Example 7-2, a Chinese yam in Example 7-3, a sweet potato in Example 7-4, garlic in Example 7-5, a tomato in Example 7-6, a yuzu orange in Example 7-7, a passion fruit in Example 7-8, a dragon fruit in Example 7-9, a shiitake mushroom in Example 7-10, soybeans in Example 7-11, barley for barley tea in Example 7-12, a burdock in Example 7-13, a bamboo shoot in Example 7-14, rice with 5 grains in Example 7-15, a prune in Example 7-16, sugarcane in Example 7-17 and a walnut in Example 7-18 were used. At that time, the pressure of the shock wave was set to 37 MPa in Examples 7-1 to 7-12, and 120 MPa in Example 7-13 to 7-15, 180 MPa in Example 7-16 and 7-17 and 55.1 MPa, 68 MPa and 120 MPa in Example 7-18.

TABLE 10

| | BEFORE SHOCK WAVE TREATMENT | | | AFTER SHOCK WAVE TREATMENT | | |
| --- | --- | --- | --- | --- | --- | --- |
| | WEIGHT BEFORE EXTRACTING JUICE (g) | WEIGHT AFTER EXTRACTING JUICE (g) | JUICE YIELD (%) | WEIGHT BEFORE EXTRACTING JUICE (g) | WEIGHT AFTER EXTRACTING JUICE (g) | JUICE YIELD (%) |
| EXAMPLE 6-1 | 134.98 | 81.05 | 39.95 | 149.79 | 47.53 | 68.27 |
| EXAMPLE 6-2 | 123.44 | 90.51 | 26.68 | 111.89 | 33.19 | 70.34 |
| EXAMPLE 6-4 | 126.43 | 79.6 | 37.04 | 137.74 | 33.66 | 75.56 |

As a result, in Examples 7-1 to 7-9, 7-13, 7-14 and 7-16, the food was softened under each set pressure, and in Examples 7-10, 7-15 and 7-18, the food was pulverized under each set pressure. In soybeans in Example 7-11, the water injection property together with softening was observed. In barley for barley tea in Example 7-12, extractability was observed as in the case of Example 4-3. In sugarcane in Example 7-17, squeezing capability together with softening was observed.

Example 8

Next, the squeezing capability of sugar beet as the food in the case where the shock wave treatment was not performed, and the case where the shock wave treatment was performed by the same steps as those in Example 1 was determined.

More specifically, the liquid yield (a juice amount) obtained through the use of a hand juicer was measured. At that time, the pressure of the shock wave was set to 50 MPa and 120 MPa.

As a result, the yield was 0 g in the case where the shock wave treatment was not performed. On the other hand, it was confirmed that in the case where a shock wave with a pressure of 50 MPa was applied, the yield was 22.71 g, and when a shock wave with a pressure of 120 MPa was applied, the liquid yield was 31.20 g. Thereby, it was found out that the extraction efficiency of juice from sugar beet was improved by the shock wave treatment.

Although the present invention is described referring to the embodiments and the examples, the invention is not limited to them, and can be variously modified. For example, the steps of treating food described in the above-described embodiments and the above-described examples can be freely changed, as long as food can be softened or pulverized by applying a shock wave.

In particular, in the above-described embodiments and the above-described examples, the case where a shock wave is applied to an apple, a Japanese radish, a pineapple, a wax gourd, tea leaves, azuki beans and coffee beans as food is described; however the invention is not limited to the case.

Moreover, in the first embodiment and the above-described examples, the case where the food is compressed, or a liquid is injected into the food is described as an additional treatment; however, the additional treatment is not limited to the case, and as the additional treatment, any other treatment except for compressing food, or injecting a liquid into food may be performed. Also in this case, the treating efficiency of the additional treatment is improved according to the softening of food, so the same effects as those in the first embodiment and the above-described examples can be obtained.

INDUSTRIAL APPLICABILITY

The method of treating food according to the invention can be applied to food typified by fruits or vegetables.

The invention claimed is:

1. Food selected from the group consisting of fruits and vegetables being subjected to a pressure ranging from greater than or equal to 37 MPa to less than or equal to 53 MPa by a shock wave by way of a shock wave source selected from the group consisting of an explosion of an explosive, an electrical pulse and hitting a metallic ball into a liquid, the shock wave source being configured to increase water-soluble pectin in the food;

wherein a flesh part of the food is in a liquid state after the food is subjected to the pressure ranging from greater than or equal to 37 MPa to less than or equal to 53 MPa.

2. The food according to claim 1, wherein the food is an apple.

3. The food according to claim 2, wherein each cell wall in the apple is damaged.

4. The food according to claim 1, wherein the food includes cells with broken cell walls.

5. The food according to claim 1, wherein a proportion of air bubbles in the food is increased compared to the food before being subjected to the pressure.

6. The food according to claim 1, wherein the food has an original shape immediately prior to being subjected to the pressure by the shock wave, which original shape of the food is substantially the same as a shape of the food when harvested, and the food retains the original shape after being subjected to the pressure.

7. The food according to claim 1, wherein the shock wave applied by the shock wave source is configured to increase both the water-soluble pectin and total pectin in the food.

8. The food according to claim 1, wherein the fruits and vegetables are selected from the group consisting of an apple, a pineapple, a wax gourd, a Japanese radish, ginger, a potato, a Chinese yam, a sweet potato, garlic, a tomato, a yuzu orange, a passion fruit, a dragon fruit, a burdock, a bamboo shoot, a prune, sugarcane, and sugar beet.

9. The food according to claim 1, wherein a peel part of the food is unbroken after being subjected to the pressure ranging from greater than or equal to 37 MPa to less than or equal to 53 MPa.

10. The food according to claim 9, wherein the food is an apple.

11. The food according to claim 1, wherein an original shape of the food is substantially the same as a shape of the food when harvested, and the food retains the original shape after being subjected to the pressure ranging from greater than or equal to 37 MPa to less than or equal to 53 MPa.

* * * * *